United States Patent [19]

Michalon

[11] Patent Number: 4,775,268
[45] Date of Patent: Oct. 4, 1988

[54] BORING DEVICE

[75] Inventor: Daniel Michalon, Saint Chamond, France

[73] Assignee: Fabrique D'Outillage de Saint Etienne Societe Anonyme, Saint Etienne, France

[21] Appl. No.: 905,179

[22] Filed: Sep. 9, 1986

[30] Foreign Application Priority Data

Sep. 9, 1985 [FR] France ................................ 85 13648
Aug. 11, 1986 [FR] France ................................ 86 11781

[51] Int. Cl.[4] .......................................... B23B 29/034
[52] U.S. Cl. ......................................... 408/156; 407/9; 408/180; 408/714
[58] Field of Search ............... 408/156, 154, 158, 159, 408/180, 181, 714; 407/8-10

[56] References Cited

U.S. PATENT DOCUMENTS 2,412,038 12/1946 Freisen ................................. 408/156
3,261,236 7/1966 Flannery ......................... 408/156 X
3,379,077 4/1968 Gustafson ........................... 408/156
3,895,881 7/1975 Langlois .............................. 408/156

OTHER PUBLICATIONS

"Adjustable Boring Bar", IBM Technical Disclosure Bulletin, vol. 21, No. 6, (11/1978), p. 2410.

Primary Examiner—Gil Weidenfeld
Assistant Examiner—Steven C. Bishop
Attorney, Agent, or Firm—Eric P. Schellin

[57] ABSTRACT

Boring device which permits the taking of dimensions with precise tolerance, characterized in that it is designed with and comprises means which permit the taking of dimensions by deformation of the neutral longitudinal axis of the tool carrier axis, which means assure a controllable and modulatable force of a part of the tool carrier axis contained between two supports.

18 Claims, 5 Drawing Sheets

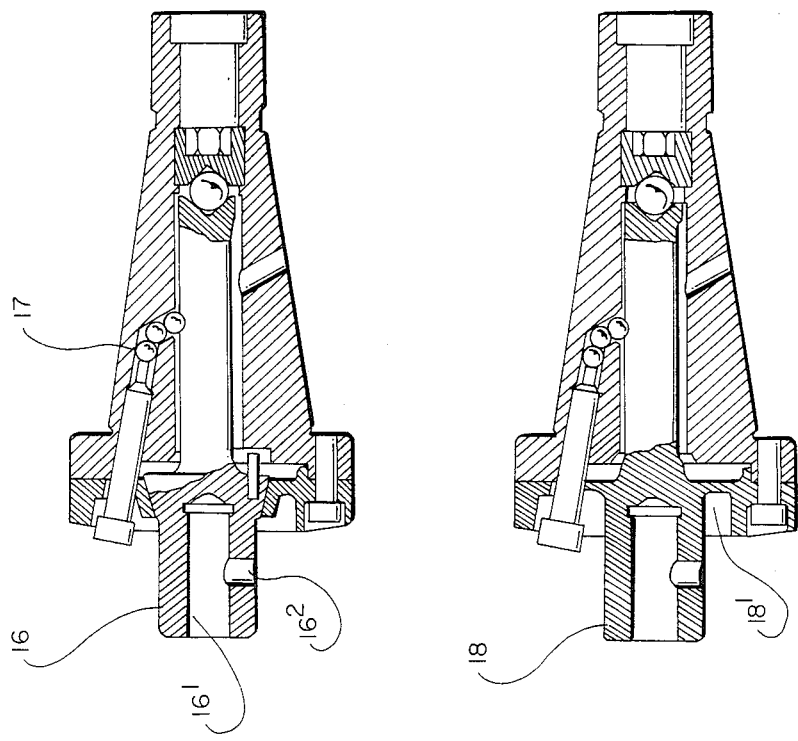

BORING DEVICE

FIELD OF THE INVENTION

This invention concerns a new type of boring attachment, where the dimension is obtained by the elastic deformation of the tool holder around its axis.

It applies to all machine tool spindles and particularly to boring and milling machines.

BACKGROUND OF THE INVENTION

One knows of very many types of boring attachments. Some are commonly called "boring heads". In this case, the cutting tool can be moved and the dimension obtained, over relatively long distances, by any guide system whose moving part is moved by a screw and nut system. Consequently, if one wishes to change the dimension of the bore to be machined, one moves the cutting part or "insert" by an amount corresponding to the chip removal desired.

One can imagine that, in this type of attachment, there is play between the taper for connecting the attachment to the spindle of the machine and the point or insert, due to the stacking of several parts, which can cause vibrations during cutting. The other disadvantage of this type of attachment is that it is expensive and relatively brittle.

One knows of other types of boring attachments called "expanding boring tools". Dimensions are obtained by means of the total deformation of the entire point. Consequently, in this precise case, there is no movement of the cutting edge of the boring tool in relation to the axis of rotation of the attachment, but there is deformation of all the cutting edges in relation to the axis of rotation.

There is also a third type of boring attachment, called "boring bars", which have at their end a cutting tool integrated into an extending system. This assembly is housed in a radial bore.

The objective sought, according to the invention, was to overcome the disadvantages and limitations of the above-mentioned attachments.

SUMMARY OF THE INVENTION

The boring attachment according to the invention is based on a new design making it possible to obtain dimensions with a precise tolerance.

According to an initial characteristic of the invention, the boring attachment is remarkable in that it is arranged in such a way as to make it possible to obtain dimensions by deformation of the longitudinal neutral fibre of the tool holder shaft.

This deformation is obtained by the bending, under an adjustable force which can be modulated, of part of the tool holder shaft contained between two supports.

According to another characteristic, the tool holder shaft of the boring attachment can be carried, in its bending part, at one end by a system of balls and tapers, with the other support being in the form of either a flexible diaphragm integral with the tool holder and locked on the fixing taper, or by means of an elastic cup in conjunction with a taper situated at the level of the support for the tool holder shaft.

According to another feature, the tool holder shaft of the boring attachment can be shortened and no longer carry the cutting tool directly, with the latter being separate from a bar which is located at the end of the boring attachment forming the subject of this invention.

According to another characteristic of the invention, the system for applying the load or force causing the bending of the tool holder bar between the two supports can be obtained by different devices located inside the body of the boring attachment and acting directly on the tool holder shaft.

According to another characteristic, the tool holder shaft is arranged with an extremely rigid part on either side of the flexible cup roughly as far as the contact face of the ball on the tool holder shaft and an extremely flexible part on the side opposite the tool, comprising between the support for the ball to obtain the dimension and the rear support of the ring permitting the application of the prestress, with the bending force only being applied to the latter part.

According to another characteristic, the extremely flexible part formed on the tool holder shaft is obtained by a special arrangement of the rear end of the tool holder shaft and of the face opposite the ring for applying the prestress and the positioning, centering and adjustment between them of a flexible device capable of elastic deformation.

These and other characteristics will emerge from the rest of the description.

BRIEF DESCRIPTION OF THE DRAWINGS

In order to determine the subject of the invention illustrated in a non-restrictive way in the figures in the drawings, where:

FIG. 4 is a longitudinal section of a third variant where the tool holder is detachable and takes a detachable tool holder bar at one of its ends;

FIG. 5 is a longitudinal section of a boring attachment similar to that in FIG. 4, but where the second support is integral with the bar holder;

DETAILED DESCRIPTION OF THE INVENTION

Figure 1:
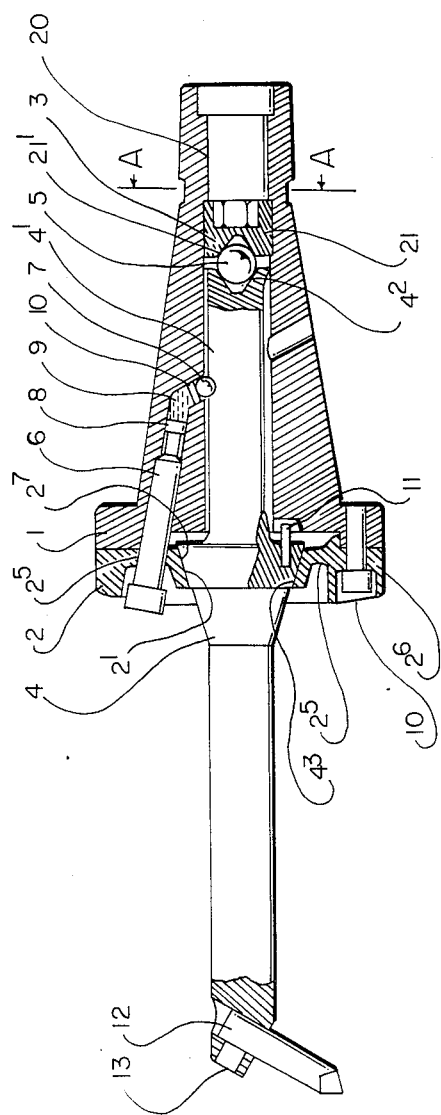
FIG. 1 is a longitudinal section of a boring attachment with the tool holder integrated into the attachment and where the elastic element is separate from the tool holder; the load is applied by means of a fluid.

By way of an example, FIG. 1 shows a boring attachment according to the invention which consists of a standard taper (1) to fit any machine tool spindle and particularly those of milling machines, boring machines and drilling machines. The connection to the spindle of the machine is formed by means of the tapered part, the two notches (19), as well as the rear threaded part (20) taking the spindle tie not shown in the drawings. The fixing attachment can be tapered, cylindrical, prismatic, square, etc.

According to an initial variant, the tool holder shaft (4) is carried by two supports. As shown by the partial section produced, the rear support is made up of an assembly of two inverted, opposite tapers between which a set of balls is located. More particularly, the rear end (4-1) of the tool holder has a shaped cavity (4-2) allowing the centering and rolling of the balls. In the opposite, facing position, there is a threaded ring (21) inserted into the inner bore (1-1) of the body (1). This ring has a front notch (21-1) allowing centering of the above-mentioned balls (5) or other equivalent devices. The said ring has a hexagonal or equivalent shape to allow its depth to be adjusted. The said ring acts as an adjusting screw.

The front support is formed by a flexible cup (2) positioned and resting on the tapered contact face (4-3) in the centre of the tool holder shaft (4). More particularly, the said cylindrical cup has a tapered central hole (2-1) enabling it to fit onto the tapered contact face (4-3). It also has an inner flange (2-2) enabling it to be centered in relation to the body (1). At the front, it has holes (2-3, 2-4) for positioning screws (6-10) entering the body (1) equipped with additional opposite holes. With reference to the figures, the screw (6) is inserted into at least one angled, shaped hole or channel (1-2) opening out into the inner bore of the said body, roughly in its centre. This screw, whose position is adjustable, has at its end, directly or detachably, a piston (8) capable of pressure on a fluid (9). A sealing ring (10) is inserted into the end of the duct between the fluid and the ball (7) resting on the tool holder shaft (4). Having been formed in this way, the screw (6) and the following elements permit the application and adjustment of the banding force at the tool holder. The normal load is transmitted by the ball (7) between the two supports of the tool holder shaft. The screw at the level of its control zone will have a certain number of markings moving in relation to a fixed marking made in the cup, so that the operator can establish the degree of chip removal which he wishes to remove in a single operation from the piece to be processed.

The flexible cup (2) is fixed by a number of screws (10) arranged regularly over its periphery in holes (1-3) made in the front cylindrical contact face of the body. In addition, the said cup has a bending zone (2-5) between its outer peripheral edge (2-6) and its contact zone (2-7) on the tapered part (4-3) of the tool holder shaft. This bending zone has the dual function of permitting slight rotation of the tool holder and the application of the prestress by axial bending.

It will be noted that the ring or adjusting screw (21), when tightened to a greater or lesser degree, applies the prestressing force between the two front and rear points of contact so that, regardless of the cutting force, there cannot be any play in the shaft/tool holder/drive taper assembly, thus avoiding any risk of vibration at the time of cutting.

Moreover, in addition to this, the end of the tool holder is designed to take the cutting tool (12), with a screw (13) locking it in position.

Figure 2:
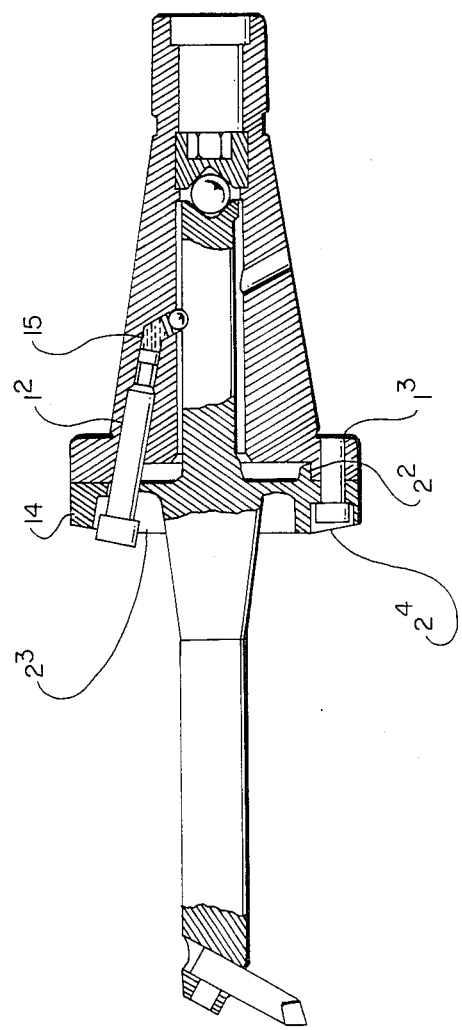
FIG. 2 is a longitudinal section of an initial variant of the attachment according to the invention, where the elastic element forms part of the tool holder. In addition, the bending force is transmitted by a flexible, deformable material of the elastomer type.

FIG. 2 shows a variant of the embodiment of the boring attachment.

In this case, the flexible cup (2) or elastic element forms part of the tool holder and has a circular flange (14) or diaphragm with a thin, deformable wall.

As a variant of FIG. 1, the system for applying the load or force causing the tool holder shaft to bend between the supports is obtained by using a flexible, deformable material (15), such as elastomeric viscous-elastic, etc., subjected, as already described, to the action of a screw and piston system (6). This is a possible illustration if one considers that the system of application could be that shown in FIG. 1.

Figure 3:
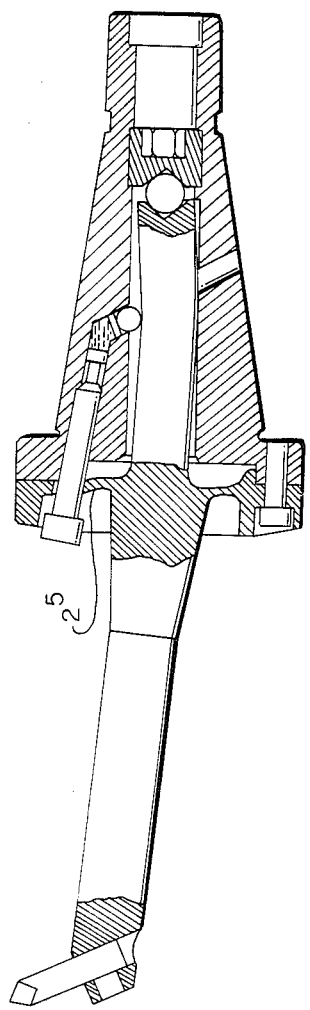
FIG. 3 is a longitudinal section similar to FIG. 2, showing the change in shape of the tool holder under the effect of a force applied between its two supports, with the angular deflection of the tool holder shaft being shown by chain-dotted lines.
Figure 6:
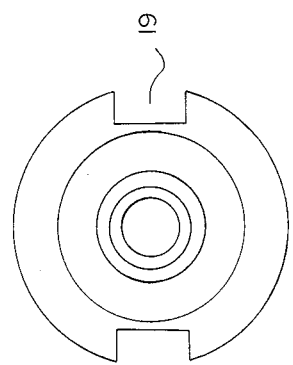
FIG. 6 is a plan view of the boring attachment along axis A.A. of FIG. 1.
Figure 7:
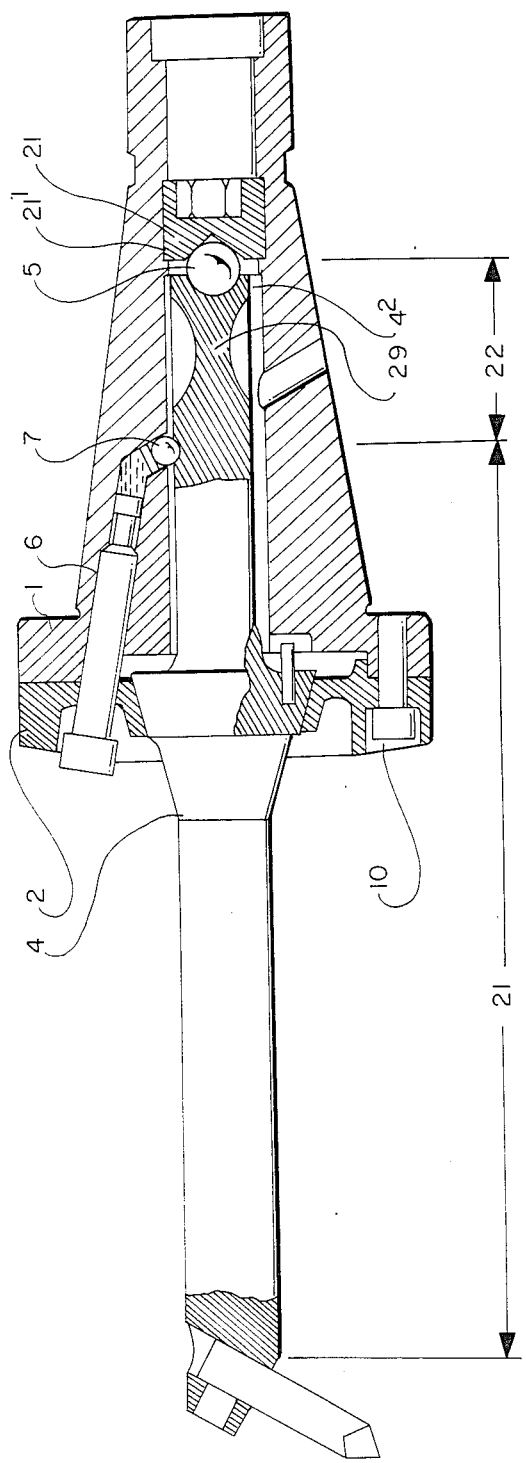
FIG. 7 is a view similar to FIG. 1, with an initial embodiment of the tool holder shaft.
Figure 8:
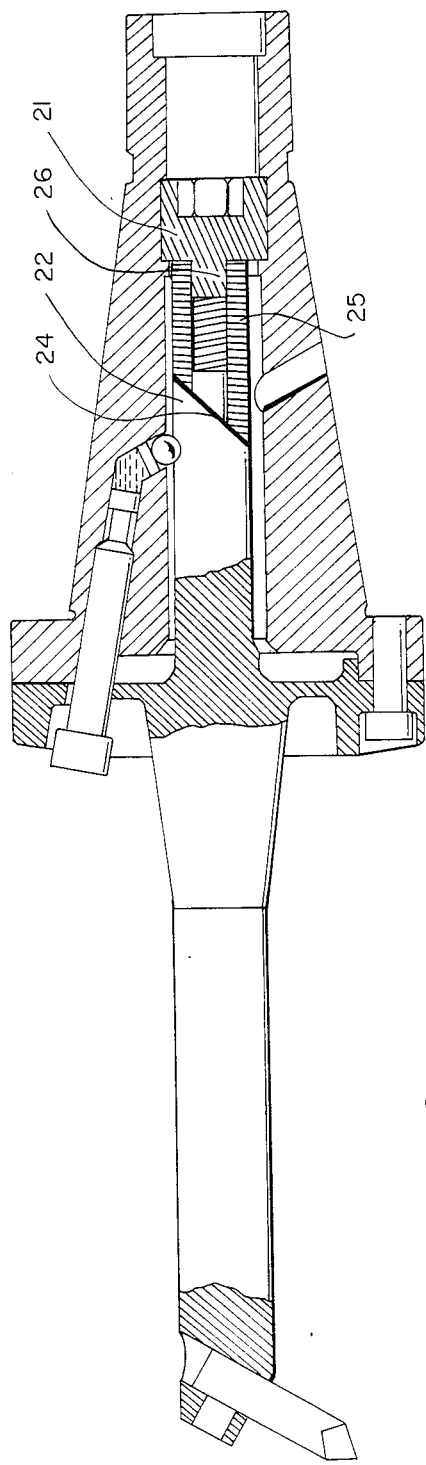
FIG. 8 is a view similar to FIG. 2 according to a view similar to FIG. 2 according to a second embodiment of the tool holder shaft.
Figure 9:
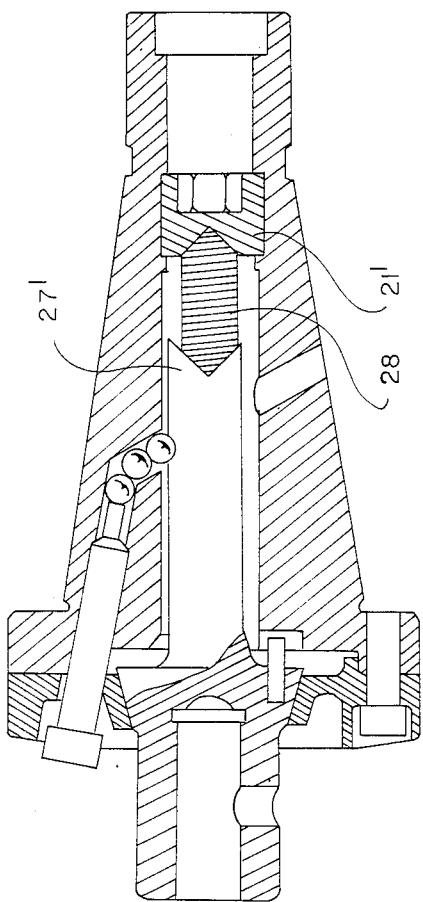
FIG. 9 is a view similar to FIG. 4 according to a third variant of the tool holder shaft.
Figure 10:
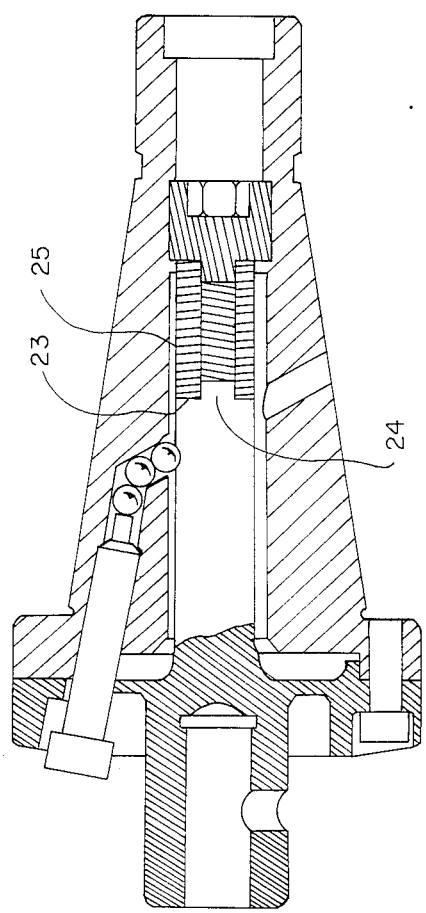
FIG. 10 is a view similar to FIG. 5 according to a fourth variant of the tool holder shaft.

FIG. 3 shows in more detail the angular deformation of the tool holder shaft subjected to the action of the load given by the setting of the screw (6). When the operator applies a force by locking the screw, with a view to "obtaining his dimension", the tool holder shaft bends between two front and rear points of contact, causing deformation of its longitudinal neutral fibre and thus moving the cutting edge of the tool a distance away in relation to the axis of rotation of the latter.

FIG. 4 shows a variant of embodiment, on the one hand, of the tool holder shaft (4) engaged in itself and, on the other hand, of devices accepting the load causing the said shaft to bend, with these two systems not being linked to each other, but capable of being combined with the previous embodiments. They have been grouped together so as not to increase the number of explanatory drawings.

In this figure corresponding to certain favourable applications of the boring attachment, the part (16) subjected to bending is no longer directly the tool holder, as previously, but has a blind hole (16-1) at one of its ends to take the tool holder bar, which is not illustrated. This bar can be of any suitable length, according to the corresponding application. A hole (16-2) permits insertion of a screw for locking the bar. The part (16) is firmly attached to the body (1) by means of a key or other equivalent means. It also has, as previously, a tapered central contact face to which the flexible cup (2) is added.

In this version, the second support permitting the application of the pre-load or prestress via the ring or screw is separate from the tool holder shaft, since it intervenes at the level of the bar holder.

With regard to the system for applying the load, as a variant one has illustrated the use of a row of balls subjected to contact pressure by the screw and piston system (6).

FIG. 5 is similar to FIG. 4, except that the bar holder part (18) is equipped directly or detachably with a deformable, flexible flange or diaphragm (18-1) capable of withstanding the positional variations of the tool holder shaft.

It is quite obvious that, without leaving the framework of the invention, other embodiments are possible at the level of the application of the load and at the level of the prestressing devices.

With reference to FIGS. 7 to 10, an alternative characteristic of the invention involves only applying the bending force to the part between the support for the bending stress corresponding to the contact of the ball (7) with the tool holder shaft and its rear end. The tool holder shaft has an extremely rigid part on either side of the deformable flexible cup (2) represented by zone (Z-1) to roughly the part of the ball (7) in contact with the tool holder shaft and an extremely flexible part on the side opposite the tool, between the support of the ball (7) for obtaining the dimension and the support for the ring (21) permitting the application of the prestress of the deformable cup represented by zone (Z-2).

In this way, under the effect of the forces applied by the device for obtaining the dimension, i.e. the screw (6) and ball (7) and the intermediate device or devices, the rigid part of the tool holder shaft oscillates due to deformation of the flexible cup (2) in proportion to the bending of the flexible part of the tool holder. This is obtained according to an initial embodiment by changing the cross-section of the tool holder shaft (4). This change results in a recess or reduction in the said cross-section between the point of contact of the tool holder shaft and the ball (7) on the one hand and the rear support formed and defined as indicated previously.

The tool holder shaft thus has a diabolo shape (29), giving it maximum flexibility for its elastic deformation.

According to the variants in FIGS. 2 and 4, the tool holder shaft (4) is set an an angle with a chamfered face (22) (FIG. 2) in a plane roughly perpendicular to the axis of the channels in which the balls are housed (7), or a straight face (23) (FIG. 4) with an extended contact face (24) of reduced cross-section. To this is fitted a ring or sleeve (25) in flexible, deformable material with a completementary front shape resting between the chamfered or straight end (22)(23) of the tool holder shaft and a contact face (26) extending the screw (21) for adjusting the prestress. The ring (25) can be made from polyurethane or other equivalent flexible material.

According to the variant in FIG. 3, the rear end of the tool holder shaft is located on a tapered recess (27-1) permitting centering of a detachable flexible element (28) fitting into a notch (21-1) in the ring (21) for adjusting the prestress.

One has described and illustrated some examples of the embodiment of the intermediate flexible element, which can be fitted to all embodiments of the boring attachment described in FIGS. 1 to 6. They fulfull the dual function of permitting the oscillation of the tool holder shaft, on the one hand, and, on the other, the application of the prestress to the flexible cup (2). By virtue of the design defined in this way, the adjusting ball (7) to obtain the dimension is always in close, firm contact with the tool holder shaft.

The advantages are clear from the description. In particular, one has emphasised the fact that this attachment makes it possible to give a bore a precise tolerance. The fact of applying a prestress between the supports gives the advantage of eliminating any play and removing any risk of vibration of the tool holder during a machining operation.

In addition, the prestress is adjustable, making it possible to change the actual frequency of the attachment and so avoid the critical machining speeds.

The attachment is also of a simple, inexpensive design and is very reliable in terms of pressure.

One also emphasises the ease of measurement and establishing the dimension to be obtained. This is measured by the action of the control screw (6) in relation to a reference graduation and is proportional to the force applied between the two tool holder supports.

I claim:

1. A boring attachment device to obtain dimensions with a precise tolerance, by deformation of a longitudinal neutral fibre of a tool holder shaft, wherein said device has an adjustable screw detachably connected to a piston which exerts pressure on a fluid to modulate force on part of the tool holder shaft to provide a stress between two tool holder supports to eliminate any play, prior to the application of a load for obtaining dimensions.

2. A boring attachment according to claims 1 comprising a fixing attachment taking said tool holder shaft characterised in that the said tool holder shaft (4) is shaped to take directly or detachably a flexible, deformable device locked onto the fixing attachment (1).

3. A boring attachment according to claims 1 comprising a fixing attachment taking said tool holder shaft characterised in that it comprises a part (16) arranged internally to take one of the ends of a tool holder bar, with the said part forming a single assembly with the fixing attachment and being fitted directly or detachably with a flexible, deformable device locked onto the fixing attachment.

4. A boring attachment according to claim 3, characterised in that said attachment has internal holes emerging in the inner bore taking the tool holder shaft permitting the application and adjustment of the force acting on the neutral fibre of the tool holder shaft.

5. A boring attachment according to claim 3, characterised in that the tool holder shaft (4) is carried by a front support and a rear support said rear support being formed on a rear end of the said shaft in conjunction with a ring (21) inserted in adjustable manner into the bore of the fixing attachment and a rolling device (5) to provide prestress between the supports, and the front support being formed by positioning and contact of a flexible, deformable device on the tool holder shaft.

6. A boring attachment according to claim 3, characterised in that the flexible, deformable device is in the form of a diaphragm (2) integral with or detachably fitted onto a tapered contact face (4-3) on the tool holder shaft said diaphragm consisting of an internal flange (2-2) for centering in relation to the fixing attachment, holes (2-3/2-4) for positioning screws (6-10) entering the attachment (1) and comprising a bending zone (2-5) between its outer peripheral edge (2-6) and its zone integral with or detachably fitted onto the tapered contact face (4-3) of the tool holder shaft.

7. A boring attachment according to claim 4, characterised in that the device permitting the application and adjustment of the force acting on the neutral fibre of the tool holder shaft comrises, a screw (6) with adjustable position, which forms a piston at its end to act via an intermediate device on a ball resting against the tool holder shaft.

8. A boring attachment according to claim 7, characterised in that the intermediate defice is a fluid (9), with a sealing ring arranged in the end of the channel between the said fluid and the ball (7).

9. A boring attachment according to claim 7, characterised in that the intermediate device is a deformable, flexible material (15).

10. A boring attachment according to claim 7, characterised in that the intermediate device consists of a row of balls (17).

11. A boring attachment according to claim 3, characterised in that the screw (6) has markings moving in relation to a fixed marking made on the deformable, flexible device.

12. A boring attachment, according to claim 11, characterised in that the tool holder shaft (4) has a rigid part on either side of the flexible diaphragm (2) as far as the contact face of the ball (7) on the tool holder shaft and a flexible part on the opposite side from the tool between the support for the ball (7) for obtaining the dimensions and the rear support for the ring (21) permitting the application of prestress, so that the bending force is applied only to the latter part.

13. A boring attachment according to claim 12, characterised in that the flexible part on the tool holder shaft (4) is obtained by a narrowing of its shaped cross-section in the form of a diabolo between the point of contact of the tool holder shaft and the ball (7), and the rear support defined by the ring (21).

14. A boring attachment according to claim 12, characterised in that the flexible part on the tool holder shaft (4) is obtained by arrangement of the rear end of the tool holder shaft and the face opposite the ring (21) for applying the prestress and the positioning, centering and adjustment between them of a flexible device capable of elastic deformation.

15. A boring attachment according to claim 14, characterised in that the flexible part on the tool holder shaft (4) is obtained by the adjustment of a sleeve (25) made from flexible, deformable material, fitting onto the centering on extending contact faces (24)(26) formed at the ends facing the tool holder shaft (4) and the ring (21) for adjusting the prestress.

16. A boring attachment according to claim 15, characterised in that the tool holder shaft (4) has a chamfered face (22) and a contact face (24) for centering and holding the sleeve (25).

17. A boring attachment according to claim 15, characterised in that the tool holder shaft (4) has a straight face (23) and a contact face (24) for centering and holding the sleeve (25).

18. A boring attachment according to claim 14, characterised in that the tool holder shaft (4) has a tapered recess (27-1) permitting the centering of a detachable flexible element (28) fitting into a notch (21-1) in the ring for adjusting the prestress.

* * * * *